(12) United States Patent
Dai et al.

(10) Patent No.: US 8,654,727 B2
(45) Date of Patent: Feb. 18, 2014

(54) METHOD AND SYSTEM FOR TRANSMITTING POSITION REFERENCE SIGNAL

(75) Inventors: Bo Dai, Shenzhen (CN); Guanghui Yu, Shenzhen (CN); Weijun Li, Shenzhen (CN); Xun Yang, Shenzhen (CN)

(73) Assignee: ZTE Corporation, Shanzhen (CN)

( * ) Notice: Subject to any disclaimer, the term of this patent is extended or adjusted under 35 U.S.C. 154(b) by 143 days.

(21) Appl. No.: 13/257,847

(22) PCT Filed: Dec. 30, 2009

(86) PCT No.: PCT/CN2009/076288
§ 371 (c)(1),
(2), (4) Date: Jan. 4, 2012

(87) PCT Pub. No.: WO2011/009277
PCT Pub. Date: Jan. 27, 2011

(65) Prior Publication Data
US 2012/0093101 A1 Apr. 19, 2012

(30) Foreign Application Priority Data
Jul. 24, 2009 (CN) .......................... 2009 1 0161521

(51) Int. Cl.
*H04W 4/00* (2009.01)

(52) U.S. Cl.
USPC ........................................ 370/329; 455/456.1

(58) Field of Classification Search
CPC ............. H04K 3/00; H04K 3/90; G04R 20/02
USPC ......... 370/203, 208, 328, 329, 341, 431, 436; 455/456.1
See application file for complete search history.

(56) References Cited

U.S. PATENT DOCUMENTS

2007/0133391 A1 6/2007 Roh
2010/0317343 A1* 12/2010 Krishnamurthy et al. . 455/435.1
2011/0158200 A1* 6/2011 Bachu et al. .................. 370/330

FOREIGN PATENT DOCUMENTS

CN 101340228 A 1/2009
(Continued)

OTHER PUBLICATIONS

Details on PRS Sequence, LG Electronics Jun. 29, 2009-Jul. 3, 2009.
Discussion on UE positioning issues May 4, 2009-May 8, 2009.
International Search Report in international application No. PCT/CN2009/076288, mailed on May 6, 2010.
English Translation of the Written Opinion of the International Search Authority in international application No. PCT/CN2009/076288, mailed on May 6, 2010.
(Continued)

*Primary Examiner* — Kerri Rose
(74) *Attorney, Agent, or Firm* — Oppedahl Patent Law Firm LLC (57) ABSTRACT

The present disclosure provides a method and system for transmitting a position reference signal, which includes: acquiring a currently needed Position Reference Signal (PRS) sequence with a length of $2 \times N_{RB}^{PRS}$, wherein $N_{RB}^{PRS}$ is the PRS bandwidth configured by high layer signaling, which is represented by a unit of a resource block; determining the position of the PRS sequence in a physical resource block; and transmitting the acquired PRS sequence on the determined position. With the method of the present disclosure, a currently needed PRS sequence is acquired directly, or at first, a PRS sequence with the maximum length is generated, and then the currently needed PRS sequence is intercepted from the PRS sequence with the maximum length. The present disclosure ensures that an effective PRS sequence can be acquired in any circumstance, thereby ensuring the realization of the positioning function of the PRS.

12 Claims, 5 Drawing Sheets

(56) References Cited

FOREIGN PATENT DOCUMENTS

| | | |
|---|---|---|
| CN | 101483466 A | 7/2009 |
| RU | 2310280 C1 | 11/2007 |
| RU | 2360372 C2 | 6/2009 |

OTHER PUBLICATIONS

LG Electronics, PRS sequence generation for downlink reference signal, 3GPP TSG RAN WG1 #52bis, R1-081248, May 31, 2008 (7 pages).

\* cited by examiner

METHOD AND SYSTEM FOR TRANSMITTING POSITION REFERENCE SIGNAL

TECHNICAL FIELD

The present disclosure relates to the field of mobile communications, particularly to a method and system for transmitting a position reference signal.

BACKGROUND

An Orthogonal Frequency Division Multiplexing (OFDM) technology is a multi-carrier modulation communication technology in essence and is one of the core technologies for the 4$^{th}$ generation mobile communication. In the frequency domain, the multi-path channel of OFDM is characterized by frequency selective fading. To overcome such fading, a channel is divided into multiple sub-channels in the frequency domain, the characteristic of the frequency spectrum of every sub-channel is approximately flat, and every sub-channel of OFDM is orthogonal with each other. Therefore, the overlap of frequency spectrums of sub-channels is allowed, so that the frequency spectrum resource can be used to the greatest extent.

Figure 1:
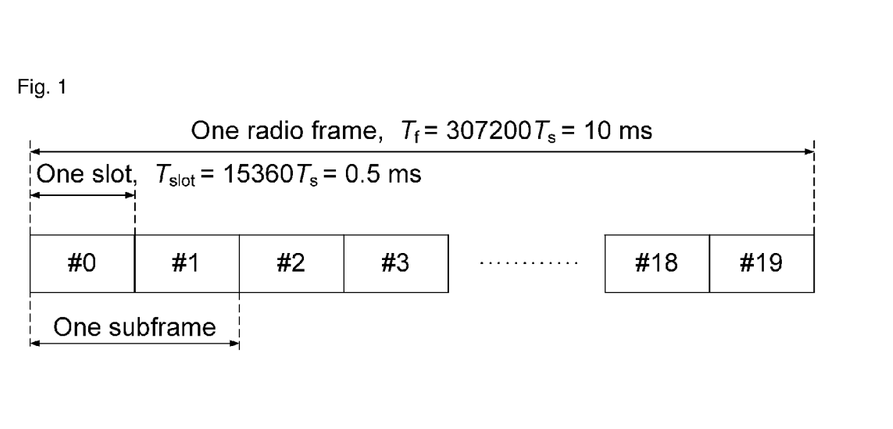
FIG. 1 shows a schematic diagram of a radio frame structure in an LTE system.
Figure 2:
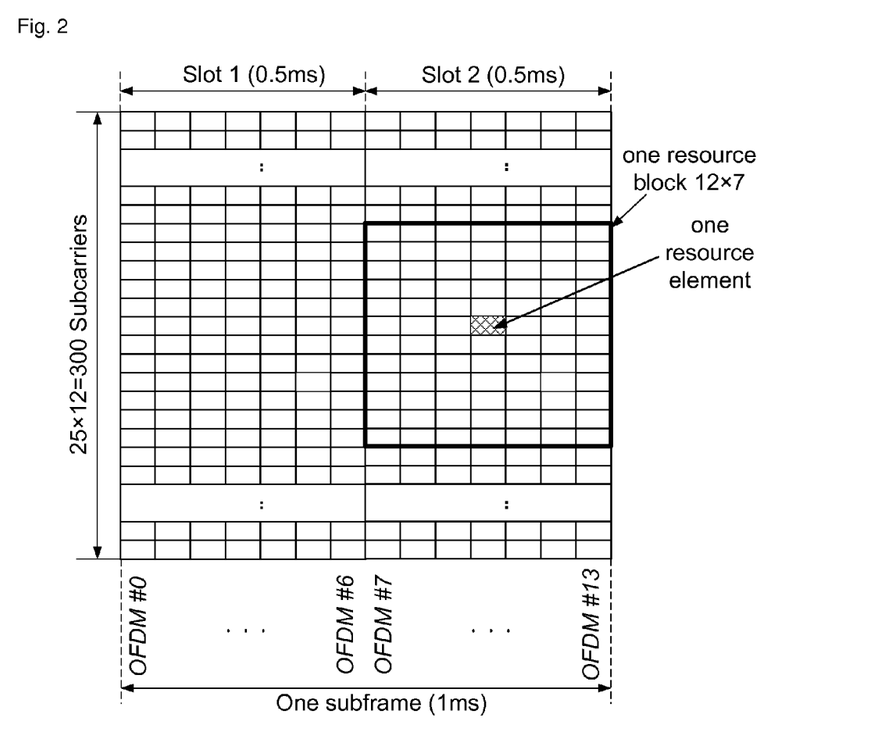
FIG. 2 shows a schematic diagram of a physical resource block in an LTE system with bandwidth of 5 MHz.

A Long Term Evolution (LTE) system is an important program of the 3$^{rd}$ Generation Partner Organization. FIG. 1 shows a frame structure under a Frequency Division Duplex (FDD) mode in an LTE system. As shown in FIG. 1, a 10 ms radio frame comprises twenty slots of a length of 0.5 ms, which are numbered #0-#19. A slot 2i and slot 2i+1 comprise a subframe i of a length of 1 ms. When the LTE system uses a subframe with a normal cyclic prefix, a slot includes 7 uplink/downlink signals and has a length of 7 uplink/downlink signals; when the LTE system uses a subframe with an extended cyclic prefix, a slot includes 6 uplink/downlink signals and has a length of 6 uplink/downlink signals. A Resource Element (RE) is a subcarrier in an OFDM symbol. If the LTE system uses a subframe with a normal cyclic prefix, then 12 contiguous subcarriers and 7 contiguous OFDM symbols constitute a downlink Resource Block (RB); if the LTE system uses a subframe with an extended cyclic prefix, then 12 contiguous subcarriers and 6 contiguous OFDM symbols constitute an RB which is 180 kHz in the frequency domain and has a time length of a normal slot in the time domain, as shown in FIG. 2. In terms of resource allocation, the resource is allocated by a unit of a resource block.

Figure 3A:
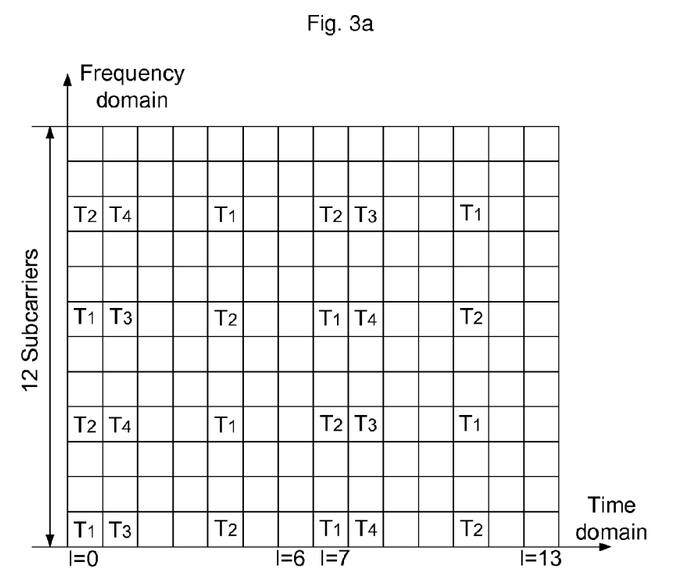
FIG. 3a is a schematic diagram of the position of a cell-specific reference signal of an LTE system in a physical resource block.
Figure 3B:
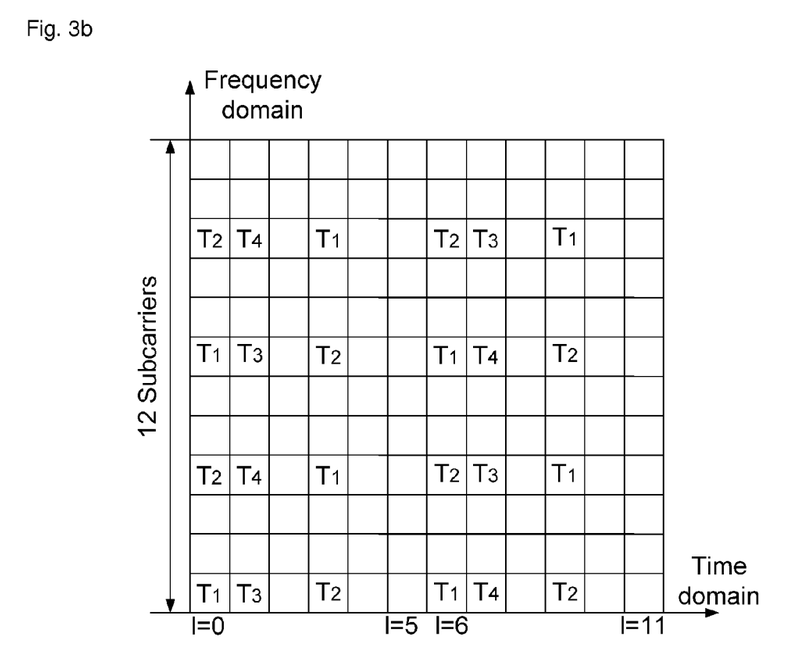
FIG. 3b is another schematic diagram of the position of a cell-specific reference signal of an LTE system in a physical resource block.

The LTE system supports the application of a 4-antenna Multiple-Input Multiple-Output (MIMO) system, and a corresponding antenna port #0, antenna port #1, antenna port #2 and antenna port #3 use full-bandwidth Cell-Specific Reference Signals (CRSs). When the cyclic prefix of a subframe is a normal cyclic prefix, the position of a CRS in a physical resource block is shown as in FIG. 3a; when the cyclic prefix of a subframe is an extended cyclic prefix, the position of the CRS in a physical resource block is shown as in FIG. 3b. In addition, there is also a UE-specific reference signal, which is only transmitted at the time and frequency domain position where a UE-specific physical downlink shared channel (PD-SCH) is located, wherein the functions of the CRS include the measurement of the downlink channel quality and estimation (demodulation) of the downlink channel.

A base station needs to measure the position of a UE in a cell, so that it can perform configuration and scheduling for the UE effectively. At present, the CRS is configured to measure the UE, but due to the semi-static configuration of the power of the CRS, the UE positioning performance is limited.

At present, the solution to the above problem is to perform positioning by is transmitting a position reference signal (PRSs), thus to ensure the positioning precision of the UE.

The transmitting cycles of the PRS are 160 ms, 320 ms, 640 ms and 1280 ms, and the numbers of contiguous subframes transmitted with the PRS are 1, 2, 4 and 6. The PRS sequence $r_{l,n_s}(m)$ is defined as per the following formula:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{PRS} - 1;$$

wherein $n_s$ is an index of a slot in a radio frame, l is the index of an OFDM symbol in a slot, and $N_{RB}^{PRS}$ is the PRS bandwidth configured by high layer signaling. The formula for generating a pseudorandom sequence c(i) is defined as follows:

$$c(i) = (x_1(i+N_c) + x_2(i+N_c)) \bmod 2$$

$$x_1(i+31) = (x_1(i+3) + x_1(i)) \bmod 2$$

$$x_2(i+31) = (x_2(i+3) + x_2(i+2) + x_2(i+1) + x_2(i)) \bmod 2;$$

wherein $N_c = 1600$, $$x_1(0) = 1, x_1(n) = 0, n = 1, 2, \ldots, 30$$

$x_2$ is generated according to the initial value of a pseudorandom sequence which is $c_{init} = \sum_{n=0}^{30} x_2(n) \cdot 2^n$, $c_{init}$ calculated according to the following formula generates a pseudorandom sequence c(i) of every OFDM symbol:

$$c_{init} = 2^{10} \cdot (7 \cdot (n_s + 1) + l + 1) \cdot (2 \cdot N_{ID}^{cell} + 1) + 2 \cdot N_{ID}^{cell} + N_{CP},$$

wherein $$N_{CP} = \begin{cases} 1 & \text{when the cyclic prefix is a normal cyclic prefix} \\ 0 & \text{when the cyclic prefix is an extended cyclic prefix} \end{cases}$$

The PRS sequence $r_{l,n_s}(m)$ is mapped to the complex modulation symbol $a_{k,l}^{(p)}$ at the antenna port p of the slot $n_s$ as per the following formula, $a_{k,l}^{(p)} = r_{l,n_s}(m')$, wherein k is the index of a subcarrier on the OFDM symbol l.

When the cyclic prefix of the system is a normal cyclic prefix:

$$k = 6m + (6 - l + v_{shift}) \bmod 6$$

$$l = \begin{cases} 3, 5, 6 & \text{if } n_s \bmod 2 = 0 \\ 1, 2, 3, 5, 6 & \text{if } n_s \bmod 2 = 1 \text{ and } (p = 0, 1) \\ 2, 3, 5, 6 & \text{if } n_s \bmod 2 = 1 \text{ and } (p = 0, 1, 2, 3); \end{cases}$$

$$m = 0, 1, K, 2 \cdot N_{RB}^{PRS} - 1$$

$$m' = m + N_{RB}^{max,DL} - N_{RB}^{PRS}$$

wherein $N_{RB}^{max,DL}$ the maximum downlink bandwidth.

When the cyclic prefix of the system is an extended cyclic prefix:

$$k = 6m + (5 - l + v_{shift}) \bmod 6$$

$$l = \begin{cases} 4, 5 & \text{if } n_s \bmod 2 = 0 \\ 1, 2, 4, 5 & \text{if } n_s \bmod 2 = 1 \text{ and } (p = 0, 1) \\ 2, 4, 5 & \text{if } n_s \bmod 2 = 1 \text{ and } (p = 0, 1, 2, 3) \end{cases}$$

$$m = 0, 1, K, 2 \cdot N_{RB}^{PRS} - 1$$

Figure 4A:
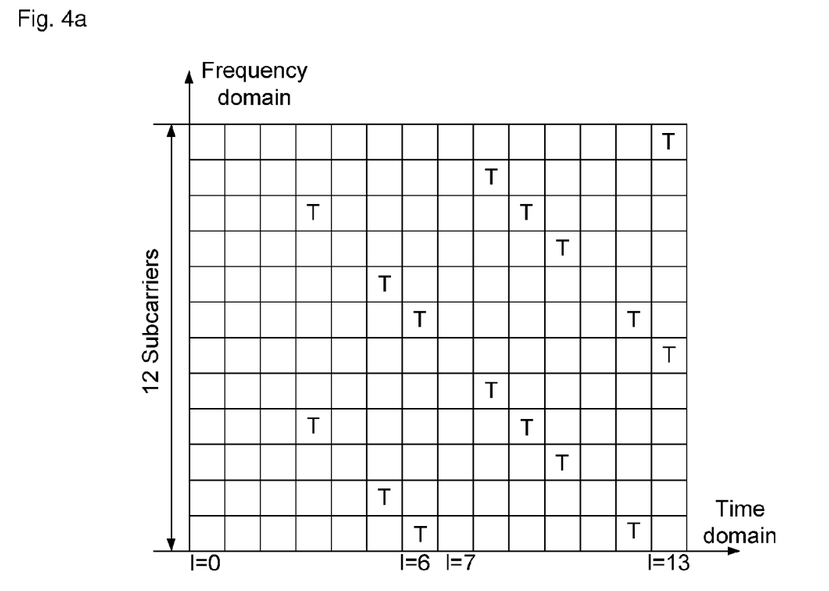
FIG. 4a is a schematic diagram of the position of a PRS in a physical resource block according to the existing solution.
Figure 4B:
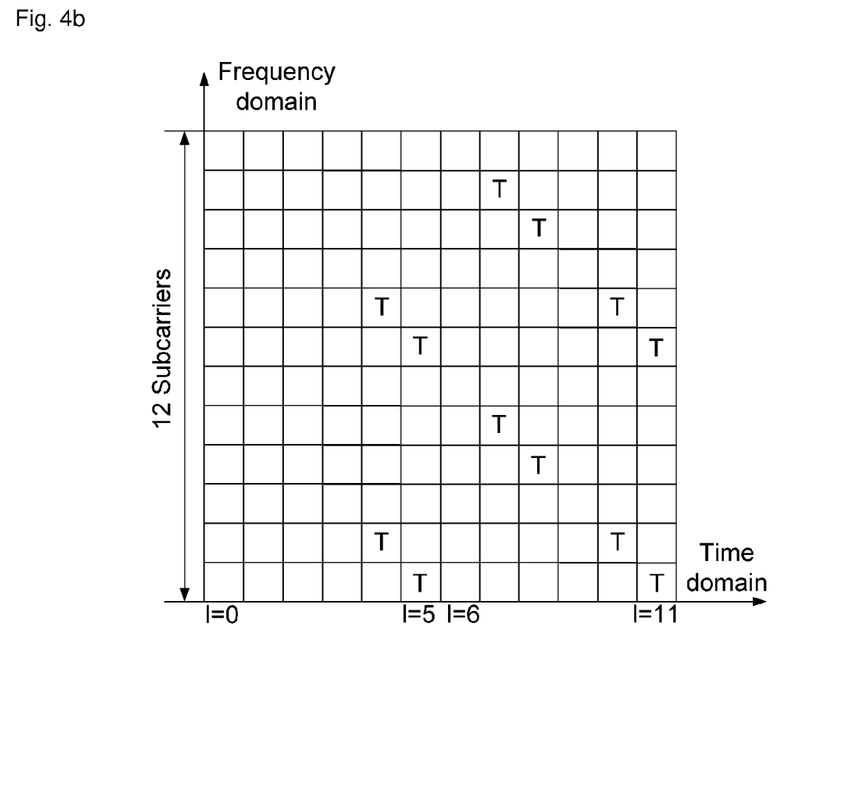
FIG. 4b is another schematic diagram of the position of a PRS in a physical resource block according to the existing solution.

-continued $$m' = m + N_{RB}^{max,DL} - N_{RB}^{PRS}$$

wherein $$v_{shift} = \left(\sum_{i''=0}^{7} 2^{i''} c\left(i'' + 8\left\lfloor\frac{n_s}{2}\right\rfloor\right)\right) \bmod 6;$$

wherein $v_{shift}$ is the initial frequency domain position of the PRS in a physical resource block, "$\lfloor\ \rfloor$" represents rounding down. According to $c_{init}=N_{Cell}^{ID}$ ($N_{Cell}^{ID}$ represents the identity of a cell), every radio frame generates a pseudorandom sequence c(i"), and the time-frequency position of a PRS in a physical resource block is as shown in FIG. 4a and FIG. 4b. As the initial frequency domain position $v_{shift}$ of the PRS in the physical resource block is generated randomly, it's not good for reducing the interference of a neighboring cell through cell layout.

In addition, in the existing solutions, a sequence $r_{l,n_s}(m)$ with the fixed length $2 \times N_{RB}^{PRS}$ is generated first when the PRS is transmitted, then the transmitting sequence $r_{l,n_s}(m')$ is acquired according to the difference of $N_{RB}^{max,DL} - N_{RB}^{PRS}$. However, as m decides the length of the pre-generated sequence $r_{l,n_s}(m)$, $r_{l,n_s}(m')$ represents the PRS data transmitted, and $m'=m+N_{RB}^{max,DL}-N_{RB}^{PRS}$ shows that $r_{l,n_s}(m')$ is acquired from $r_{l,n_s}(m)$, therefore when $N_{RB}^{max,DL}-N_{RB}^{PRS}$ is not equal to 0, m' will certainly go beyond the scope of values of m, and as a result, $r_{l,n_s}(m')$ will be meaningless and effective PRS sequence data can not be acquired.

SUMMARY

The technical problem to be solved by the present disclosure is to provide a method for transmitting a position reference signal to ensure that an effective PRS sequence can be acquired in any circumstance, thereby assuring the realization of the positioning function of a PRS.

To solve the aforementioned technical problem, the present disclosure provides a method for transmitting a position reference signal, which includes:

acquiring a currently needed position reference signal (PRS) sequence with a length of $2 \times N_{RB}^{PRS}$, wherein $N_{RB}^{PRS}$ is PRS bandwidth configured by high layer signaling, and represented by the unit of a resource block;

determining a position of the PRS sequence in a physical resource block; and transmitting the acquired PRS sequence at the determined position.

The PRS sequence with the length of $2 \times N_{RB}^{PRS}$ may be represented by $r_{l,n_s}(m')$, $$r_{l,n_s}(m') = \frac{1}{\sqrt{2}}(1 - 2 \cdot c(2m')) + j\frac{1}{\sqrt{2}}(1 - 2 \cdot c(2m'+1)),$$

$$m' = 0, 1, \ldots, 2N_{RB}^{PRS} - 1,$$

or, $$r_{l,n_s}(m') = \frac{1}{\sqrt{2}}(1 - 2 \cdot c(2m')) + j\frac{1}{\sqrt{2}}(1 - 2 \cdot c(2m'+1)),$$

wherein $$m' = h, h+1, \ldots h + 2N_{RB}^{PRS} - 1,$$

$$h = N_{RB}^{max,DL} - N_{RB}^{PRS}, \text{ or, } h = (N_{RB}^{max,DL} - N_{RB}^{PRS}) \times 2,$$

wherein $n_s$ is an index of a slot in a radio frame, l is the index of an OFDM symbol in a slot, $N_{RB}^{max,DL}$ is the maximum downlink bandwidth, and c(i) is a first is pseudorandom sequence generated by an initial value $c_{init}$ of a pseudorandom sequence.

Acquiring the currently needed PRS sequence with the length of $2 \times N_{RB}^{PRS}$ may include:

generating a PRS sequence with a length of $2 \times N_{RB}^{max,DL}$, wherein $N_{RB}^{max,DL}$ is the maximum downlink bandwidth; and Intercepting the PRS sequence with the length of $2 \times N_{RB}^{PRS}$ from the PRS sequence with the length of $2 \times N_{RB}^{max,DL}$.

The PRS sequence $r_{l,n_s}(m)$ with the length of $2 \times N_{RB}^{max,DL}$ is:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{PRS} - 1;$$

wherein $n_s$ is an index of a slot in a radio frame, l is an index of an OFDM symbol in a slot, and c(i') is a second pseudorandom sequence generated by an initial value $c_{init}$ of a pseudorandom sequence.

When the subframe is a non-MBSFN subframe, $$c_{init} = 2^{10} \cdot (7 \cdot (n_s + 1) + l + 1) \cdot (2 \cdot N_{ID}^{cell} + 1) + 2 \cdot N_{ID}^{cell} + N_{CP},$$

wherein $$N_{CP} = \begin{cases} 1 & \text{when the cyclic prefix is a normal cyclic prefix} \\ 0 & \text{when the cyclic prefix is an extended cyclic prefix,} \end{cases}$$

and $N_{Cell}^{ID}$ is the identity of a cell;

when the subframe is an MBSFN subframe, $c_{init}=2^9 \cdot (7 \cdot (n_s+1)+l+1) \cdot (2 \cdot N_{ID}^{MBSFN}+1)+N_{ID}^{MBSFN}$, wherein $N_{ID}^{MBSFN}$ is an identity of an MBSFN subframe.

Intercepting the PRS sequence with the length of $2 \times N_{RB}^{PRS}$ from the generated PRS sequence with the length of $2 \times N_{RB}^{max,DL}$ may include:

the generated PRS sequence with the length of $2 \times N_{RB}^{PRS}$ is represented by $r_{l,n_s}(m')$, wherein $m'=q+h$ and $q=0,1,K,2 \cdot N_{RB}^{PRS}-1$, and $h=N_{RB}^{max,DL}-N_{RB}^{PRS}$, or, $h=(N_{RB}^{max,DL}-N_{RB}^{PRS}) \times 2$.

determining an initial frequency domain position $v_{shift}$ of the PRS sequence in the physical resource block may be:

$$v_{shift} = \left(\sum_{i''=0}^{7} 2^{i''} c\left(i'' + 8\left\lfloor\frac{n_s}{2}\right\rfloor\right)\right) \bmod 6; \text{ or}$$

$$v_{shift} = \left(\sum_{i''=0}^{7} 2^{i''} c(i'')\right) \bmod 6; \text{ or}$$

$$v_{shift} = N_{Cell}^{ID} \bmod 6,$$

wherein a third pseudorandom sequence c(i") is generated according to $c_{init}=N_{Cell}^{ID}$, and $N_{Cell}^{ID}$ is an identity of a cell.

In a non-MBSFN subframe, determining the position of the PRS sequence in the physical resource block may be:

when the cyclic prefix of a system is a normal cyclic prefix:

$$k = 6q + (6 - l + v_{shift}) \bmod 6$$

$$l = \begin{cases} 3, 5, 6 & \text{if } n_s \bmod 2 = 0 \\ 1, 2, 3, 5, 6 & \text{if } n_s \bmod 2 = 1 \text{ and } (p = 0, 1) \\ 2, 3, 5, 6 & \text{if } n_s \bmod 2 = 1 \text{ and } (p = 0, 1, 2, 3) \end{cases}$$

$$q = 0, 1, K, 2 \cdot N_{RB}^{PRS} - 1;$$

when the cyclic prefix of a system is an extended cyclic prefix:

$$k = 6q + (5 - l + v_{shift}) \bmod 6$$

$$l = \begin{cases} 4, 5 & \text{if } n_s \bmod 2 = 0 \\ 1, 2, 4, 5 & \text{if } n_s \bmod 2 = 1 \text{ and } (p = 0, 1) \\ 2, 4, 5 & \text{if } n_s \bmod 2 = 1 \text{ and } (p = 0, 1, 2, 3) \end{cases}$$

$$q = 0, 1, K, 2 \cdot N_{RB}^{PRS} - 1;$$

In an MBSFN subframe, determining the position of the PRS sequence in the is physical resource block may be:

$$k = 6q + (5 - l + v_{shift}) \bmod 6$$

$$l = \begin{cases} 2, 3, 5, 6 & \text{if } n_s \bmod 2 = 0 \\ 0, 1, 2, 3, 4, 5 & \text{if } n_s \bmod 2 = 1 \end{cases}$$

$$q = 0, 1, K, 2 \cdot N_{RB}^{PRS} - 1;$$

wherein l is an index of an OFDM symbol in a slot, k is an index of a subcarrier on an OFDM symbol l, p is an antenna port, and $v_{shift}$ is an initial frequency domain position of a PRS sequence in a physical resource block.

Transmitting the acquired PRS sequence at the determined position may include:

when the PRS sequence and data carried by a physical downlink control channel (PDCCH) are transmitted on the same bandwidth, only the data carried by the PDCCH is transmitted;

Transmitting the acquired PRS sequence at the determined position may include:

when the PRS sequence and data carried by a Physical Downlink Shared Channel (PDSCH) are transmitted on the same bandwidth, a carrier mapped with PRS is avoided when mapping PDSCHs of R10 and R9 versions onto carriers; and when the PRS and data carried by a PDSCH of R8 version are transmitted on a same Resource Element (RE), only the PRS data on the RE is transmitted.

Transmitting the acquired PRS sequence at the determined position may include:

when the PRS sequence and data carried by a PDSCH are transmitted on the same bandwidth, the power of each RE of PRS is consistent with the power of an RE of the PDSCH carrying the data on the OFDM symbol where the RE of PRS is located; and when the PRS sequence and data carried by a PDSCH are transmitted on different bandwidth, the power of each RE of PRS is 6 times the power of RE of the PDSCH carrying the data on the OFDM symbol where the RE of PRS is located.

Transmitting the acquired PRS sequence at the determined position may include:

the transmitting power of the PRS sequence is consistent with the transmitting power of a Cell-Specific Reference Signal (CRS); or the transmitting power of the PRS sequence is configured through signaling.

The present disclosure further provides a system for transmitting a position reference signal, which includes a PRS sequence acquiring unit, a positioning unit and a transmitting unit;

wherein the PRS sequence acquiring unit is configured to acquire a currently needed PRS sequence with a length of $2 \times N_{RB}^{PRS}$, wherein $N_{RB}^{PRS}$ is PRS bandwidth configured by high layer signaling;

the positioning unit is configured to determine a position of the PRS sequence acquired by the PRS sequence acquiring unit in a physical resource block; and the transmitting unit is configured to transmit the PRS sequence acquired by the PRS sequence acquiring unit at the position determined by the positioning unit.

The PRS sequence acquiring unit may include a PRS sequence generating unit and an intercepting unit;

wherein the PRS sequence generating unit is configured to generate a PRS sequence with a length of $2 \times N_{RB}^{max,DL}$, wherein $N_{RB}^{max,DL}$ is the maximum downlink is bandwidth; and the intercepting unit is configured to intercept the PRS sequence with the length of $2 \times N_{RB}^{PRS}$ from the PRS sequence with the length of $2 \times N_{RB}^{max,DL}$ generated by the PRS sequence generating unit.

It is thus clear that, with the transmitting method and the transmitting system provided in the present disclosure, a currently needed PRS sequence can be acquired directly, or a PRS sequence with the maximum length is generated first, and then the currently needed PRS sequence is intercepted from the PRS sequence with the maximum length. The method and the system ensure that an effective PRS sequence can be acquired in any circumstance, thus to assure the realization of the positioning function of the PRS.

DETAILED DESCRIPTION

In the following, the technical solution of the present disclosure is described in detail in combination with the drawings and the embodiments.

Figure 6:
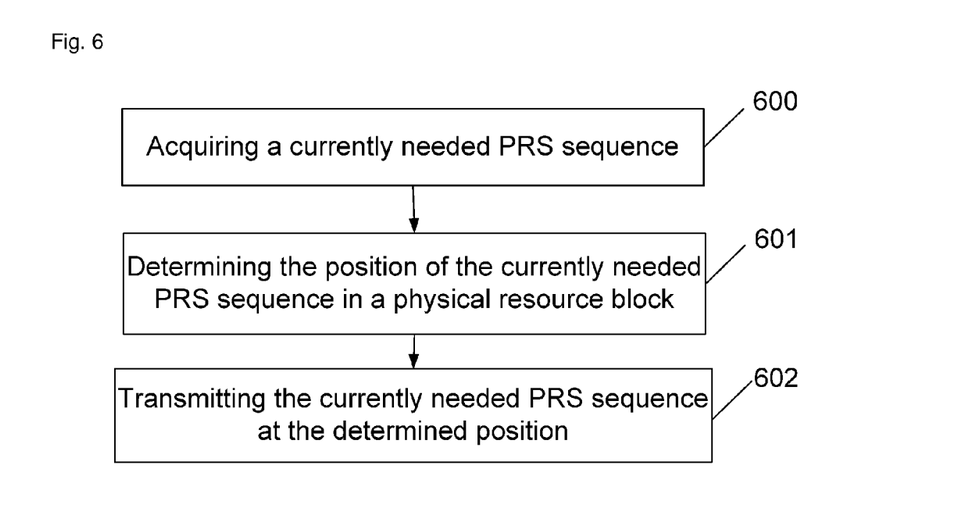
FIG. 6 is a flow chart of a PRS transmitting method based on an embodiment of the present disclosure.

FIG. 6 is a flow chart of a PRS transmitting method based on an embodiment of the present disclosure. As shown in FIG. 6, the PRS transmitting method based on the embodiment of the present disclosure includes:

Step 600: acquiring a currently needed PRS sequence with a length of $2 \times N_{RB}^{PRS}$, which is represented by a unit of a resource block; there are two specific ways for realization, as follows:

The first way:

directly generating the currently needed PRS sequence $r_{l,n_s}(m')$ with the length of $2 \times N_{RB}^{PRS}$, wherein $N_{RB}^{PRS}$ is the PRS bandwidth configured by high layer signaling, it is made that $$r_{l,n_s}(m') = \frac{1}{\sqrt{2}}(1 - 2 \cdot c(2m')) + j\frac{1}{\sqrt{2}}(1 - 2 \cdot c(2m'+1)),$$

wherein $m'=0,1,\ldots,2N_{RB}^{PRS}-1$; or it is made that $$r_{l,n_s}(m') = \frac{1}{\sqrt{2}}(1 - 2 \cdot c(2m')) + j\frac{1}{\sqrt{2}}(1 - 2 \cdot c(2m'+1)),$$

wherein $m'=h,h+1,\ldots,h+2N_{RB}^{PRS}-1$, $h=N_{RB}^{max,DL}-N_{RB}^{PRS}$, or, $h=(N_{RB}^{max,DL}-N_{RB}^{PRS}) \times 2$;

wherein $n_s$ is an index of a slot in a radio frame, l is the index of an OFDM symbol in a slot, $N_{RB}^{max,DL}$ is the maximum downlink bandwidth, and c(i) is a pseudorandom sequence generated according to an initial value $c_{init}$ of a pseudorandom sequence.

In a non-Multicast Broadcast Single Frequency Network (MBSFN) subframe, $$c_{init} = 2^{10} \cdot (7 \cdot (n_s + 1) + l + 1) \cdot (2 \cdot N_{ID}^{cell} + 1) + 2 \cdot N_{ID}^{cell} + N_{CP},$$

wherein $N_{CP} = \begin{cases} 1 & \text{when the cyclic prefix is a normal cyclic prefix} \\ 0 & \text{when the cyclic prefix is an extended cyclic prefix;} \end{cases}$ when the subframe is an MBSFN,
$c_{init}=2^9 \cdot (7 \cdot (n_s+1)+l+1) \cdot (2 \cdot N_{ID}^{MBSFN}+1)+N_{ID}^{MBSFN}$,
wherein $N_{ID}^{MBSFN}$ is the identity of an MBSFN subframe.

With the first way, a currently needed PRS sequence $r_{l,n_s}(m')$ can be acquired directly, which avoids the procedure that a PRS sequence with a pre-determined length is generated and then the interception is performed, thus making the operation more convenient and direct.

The second way:

first, the PRS sequence $r_{l,n_s}(m)$ with the maximum length $2 \times N_{RB}^{max,DL}$ is generated according to the downlink bandwidth;

the PRS sequence $r_{l,n_s}(m)$ in this embodiment is defined according to the following formula:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1;$$

wherein $n_s$ is an index of a slot in a radio frame, l is the index of an OFDM symbol in a time slot, $N_{RB}^{max,DL}$ is the maximum downlink bandwidth, and c(i') is a pseudorandom sequence generated according to $c_{init}$. The specific generating method is not described in detail here again because it is similar to the method described as above.

When the subframe is a non-MBSFN subframe, $$c_{init} = 2^{10} \cdot (7 \cdot (n_s + 1) + l + 1) \cdot (2 \cdot N_{ID}^{cell} + 1) + 2 \cdot N_{ID}^{cell} + N_{CP},$$

wherein $N_{CP} = \begin{cases} 1 & \text{when the cyclic prefix is a normal cyclic prefix} \\ 0 & \text{when the cyclic prefix is an extended cyclic prefix;} \end{cases}$ when the subframe is an MBSFN subframe, $c_{init}=2^9 \cdot (7 \cdot (n_s+1)+l+1) \cdot (2 \cdot N_{ID}^{MBSFN}+1)+N_{ID}^{MBSFN}$, wherein $N_{ID}^{MBSFN}$ is the identity of an MBSFN subframe.

Then, the currently needed PRS sequence $r_{l,n_s}(m')$ is intercepted from the PRS sequence $r_{l,n_s}(m)$, wherein $m'=q+h$, wherein $q=0,1,K,2 \cdot N_{RB}^{PRS}-1$, wherein $N_{RB}^{PRS}$ is the PRS bandwidth configured by high layer signaling, and $h=N_{RB}^{max,DL}-N_{RB}^{PRS}$, or, $h=(N_{RB}^{max,DL}-N_{RB}^{PRS}) \times 2$, the intercepted length depends on the scope of q, and h represents the starting position of intercepting.

With the second way, the $r_{l,n_s}(m)$ sequence is generated according to the maximum length $N_{RB}^{max,DL}$ and then the starting position of intercepting from $r_{l,n_s}(m)$ is limited by $h \leq (N_{RB}^{max,DL}-N_{RB}^{PRS}) \times 2$.

In such way, when the PRS sequence $r_{l,n_s}(m')$ is intercepted, the interception may be started from a fixed position of the PRS sequence, $r_{l,n_s}(m)$, and the interception may also be implemented dynamically according to the bandwidth of the current PRS. If $N_{RB}^{max,DL}=N_{RB}^{PRS}$, i.e. h=0, then the interception may be started from the starting position of the PRS sequence $r_{l,n_s}(m)$. If $h=(N_{RB}^{max,DL}-N_{RB}^{PRS}) \times 2$, then the interception may be started from the ending position of the PRS sequence $r_{l,n_s}(m)$, i.e. deducting the PRS sequence with the unnecessary length from the starting position; if $N_{RB}^{max,DL} \neq N_{RB}^{PRS}$, then the interception may be implemented dynamically according to the current bandwidth $N_{RB}^{PRS}$ of the PRS, i.e. h is generated according to the bandwidth of the current PRS, and $h=N_{RB}^{max,DL}-N_{RB}^{PRS}$, and then the PRS sequence $r_{l,n_s}(m')$ with the length of $N_{RB}^{PRS}$ is intercepted at the $h^{th}$ position of the PRS sequence $r_{l,n_s}(m)$.

In the second way, a PRS sequence $r_{l,n_s}(m)$ with the maximum downlink bandwidth length is generated first, and then a PRS sequence $r_{l,n_s}(m')$ with the currently needed length of bandwidth is intercepted from the PRS sequence $r_{l,n_s}(m)$, in such way, an effective PRS sequence can be acquired in any circumstance, thus to ensure the realization of the positioning function of the PRS.

Step 601: determining the position of the PRS sequence $r_{l,n_s}(m')$ in a physical resource block. The specific method for realizing this step is:

first, acquiring the initial frequency domain position $v_{shift}$ of the PRS sequence $r_{l,n_s}(m')$:

$$v_{shift} = \left(\sum_{i''=0}^{7} 2^{i''} c\left(i'' + 8\left\lfloor\frac{n_s}{2}\right\rfloor\right)\right) \mod 6;$$

or, $$v_{shift} = \left(\sum_{i''=0}^{7} 2^{i''} c(i'')\right) \mod 6;$$

wherein every radio frame generates a pseudorandom sequence c(i") according to $c_{init}=N_{Cell}^{ID}$ ($N_{Cell}^{ID}$ is the identity of a cell), here the initial frequency domain position $v_{shift}$ of the PRS in the physical resource block is generated randomly.

It can also be defined that $v_{shift}=n_{Cell}^{ID}$ mod 6, under this circumstance, the initial frequency domain position $v_{shift}$ has already been determined, which helps to reduce the interference from neighboring cells through cell layout.

Then, the position of the PRS sequence $r_{l,n_s}(m')$ in the configured physical resource block is acquired according to the initial frequency domain position $v_{shift}$. In the following, the acquisitions of the physical resource positions of the PRS sequence $r_{l,n_s}(m')$ in a non-MBSFN frame and an MBSFN frame are described respectively.

(1) In a non-MBSFN frame when the cyclic prefix of a system is a normal cyclic prefix, the position of the PRS sequence $r_{l,n_s}(m')$ in the configured physical resource block is:

$$k = 6q + (6 - l + v_{shift}) \bmod 6$$

$$l = \begin{cases} 3, 5, 6 & \text{if } n_s \bmod 2 = 0 \\ 1, 2, 3, 5, 6 & \text{if } n_s \bmod 2 = 1 \text{ and } (p = 0, 1) \\ 2, 3, 5, 6 & \text{if } n_s \bmod 2 = 1 \text{ and } (p = 0, 1, 2, 3), \end{cases}$$

$$q = 0, 1, K, 2 \cdot N_{RB}^{PRS} - 1$$

wherein k is the index of a subcarrier on the OFDM symbol l;

when the cyclic prefix of a system is an extended cyclic prefix, the position of the PRS sequence $r_{l,n_s}(m')$ in the configured physical resource block is:

$$k = 6q + (6 - l + v_{shift}) \bmod 6$$

$$l = \begin{cases} 3, 5, 6 & \text{if } n_s \bmod 2 = 0 \\ 1, 2, 3, 5, 6 & \text{if } n_s \bmod 2 = 1 \text{ and } (p = 0, 1) \\ 2, 3, 5, 6 & \text{if } n_s \bmod 2 = 1 \text{ and } (p = 0, 1, 2, 3), \end{cases}$$

$$q = 0, 1, K, 2 \cdot N_{RB}^{PRS} - 1$$

wherein k is the index of a subcarrier on the OFDM symbol l.

Figure 5:
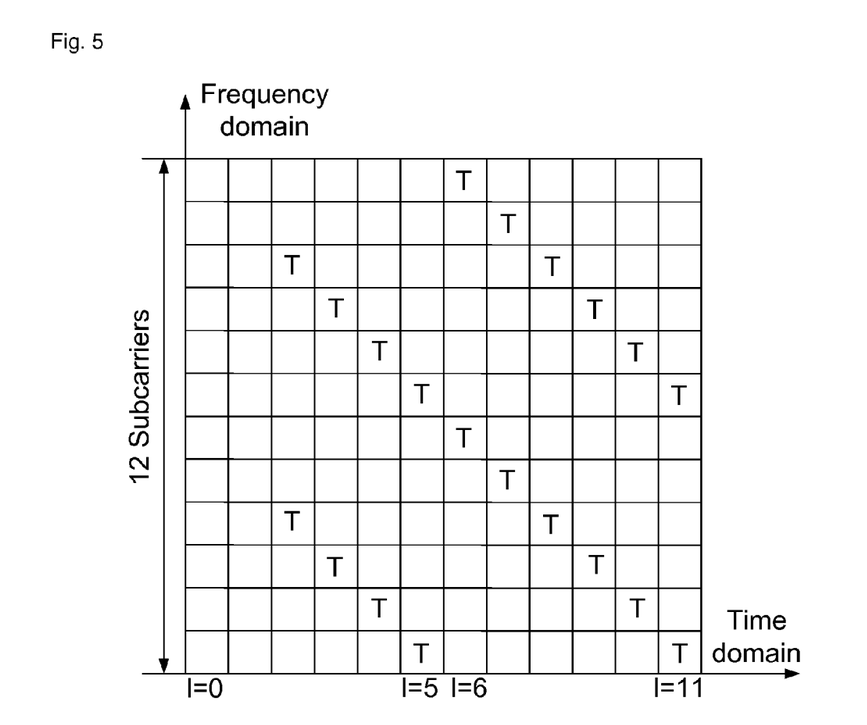
FIG. 5 is a schematic diagram of the position of a PRS in a physical resource block when the subframe is an MBSFN.

(2) In an MBSFN subframe the position of the PRS sequence $r_{l,n_s}(m')$ in the configured physical resource $$k=6q+(5-l+v_{shift}) \bmod 6$$

block, as shown in FIG. 5 is:

$$l = \begin{cases} 2, 3, 4, 5 & \text{if } n_s \bmod 2 = 0 \\ 0, 1, 2, 3, 4, 5 & \text{if } n_s \bmod 2 = 1, \end{cases}$$

$$q = 0, 1, K, 2 \cdot N_{RB}^{PRS} - 1$$

wherein k is the index of a subcarrier on the OFDM symbol l.

Using the above-mentioned formula in the MBSFN subframe has some advantages, which include simple mapping, similar to the way of mapping adopted for the normal cyclic prefix and extended cyclic prefix, thus realization being achieved by using the same method. All of these advantages help to reduce the complexity of realization.

The order of Step 600 and Step 601 may be combined arbitrarily, i.e. the position of the PRS sequence $r_{l,n_s}(m')$ in the physical resource block can also be determined first, then the currently needed PRS sequence with the length of $2 \times N_{RB}^{PRS}$ is acquired; or the position of the PRS sequence $r_{l,n_s}(m')$ in the physical resource block is determined in the process of acquiring the currently needed PRS sequence with the length of $2 \times N_{RB}^{PRS}$.

Step 602: Transmitting the PRS sequence $r_{l,n_s}(m')$ at the determined physical resource position;

wherein the PRS sequence $r_{l,n_s}(m')$ is mapped to the complex modulation symbol $a_{k,l}^{(p)}$ in the slot $n_s$ of the antenna port p and then is transmitted, there is $a_{k,l}^{(p)}=r_{l,n_s}(m')$, which represents that the PRS sequence $r_{l,n_s}(m')$ is transmitted on the carrier k on the $l^{th}$ OFDM in the $n_s^{th}$ slot of the antenna port p.

When the PRS and the data of a physical downlink control channel (PDCCH), a physical hybrid-ARQ indicator channel (PHICH), a primary synchronization channel (PSCH), a secondary synchronization channel (SSCH) or a physical broadcast channel is (PBCH) are transmitted on the same RE, the PRS symbol on the RE is knocked out (or covered), i.e. only the data of the PDCCH, PHICH, PSCH, SSCH or PBCH is transmitted, or in other words, the PRS on the RE is not transmitted.

When the PRS and the data of the PDSCH are transmitted on the same bandwidth, the PDSCHs of R10 and R9 versions avoid PRS mapping when mapped to the resource area, namely, when the data carried by PDSCHs of R10 and R9 versions implement rate matching, the length of data after code rate matching is calculated according to the resource from which the resource occupied by the PRS is deducted, namely, PDSCHs of R10 and R9 versions avoid any carrier mapped with the PRS when implementing mapping.

When the data carried by the PDSCH of R8 version and the PRS are transmitted on the same RE, the data of the PDSCH of R8 version is knocked out, in other words, the data carried by the PDSCH of R8 version on the RE is not transmitted, and only the PRS data on the RE is transmitted.

In addition, when the PRS and the data carried by the PDSCH are transmitted on the same bandwidth or on the same physical resource block, the power of each RE of PRS is consistent with the power of other RE of the PDSCH on the OFDM symbol where the RE of PRS is located, which can ensure that the whole system has a unified power, making the control operations simpler; when the PRS and the data carried by the PDSCH are transmitted on different bandwidths, the power of each RE of PRS is 6 times the power of other RE on the OFDM symbol where the RE of PRS is located, under the condition that the total power is constant, the power of the RE of the PRS is increased, thus improving the PRS-transmitting performance; in special circumstances, the transmitting power may be 0, namely not transmitting the PRS; or the transmitting power of the PRS may be the same as the transmitting power of the CRS; or the is transmitting power of the PRS may be configured through signaling, i.e. $a_{k,l}^{(p)}=\alpha \times r_{l,n_s}(m')$, wherein α is the power regulation factor, and the value of α is controlled by high layer signaling.

Figure 7:
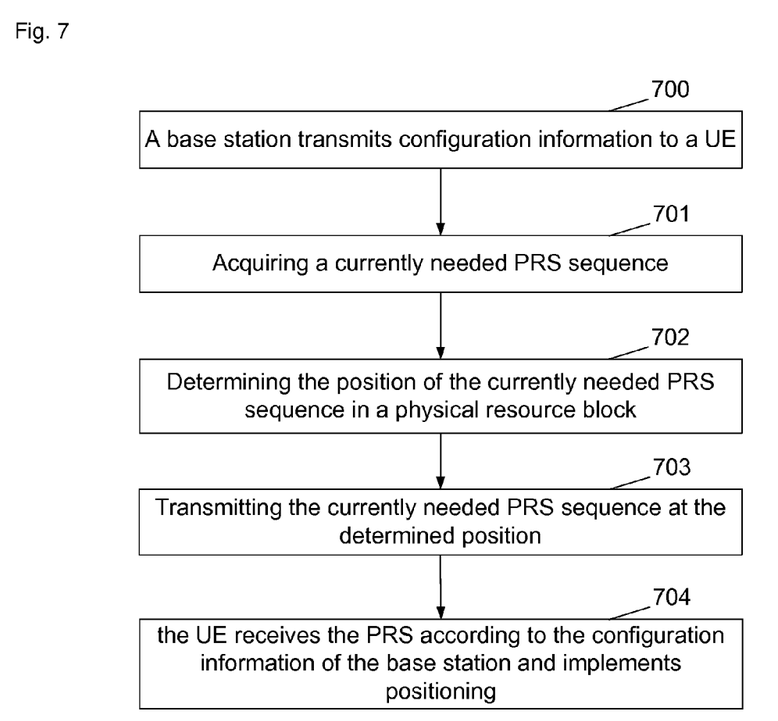
FIG. 7 is a flow chart of an application example of a method for positioning based on the PRS transmitting method of the present disclosure.

FIG. 7 is a flow chart of an application example of a method for positioning based on the PRS transmitting method of the present disclosure. As shown in FIG. 7, the method for positioning based on the PRS transmitting method of the present disclosure includes the following steps:

Step 700: a base station transmits configuration information to a UE.

In this step, the configuration information includes a position collaboration cell set (the position collaboration cell set at least includes cell IDs), the generating cycle and initial subframe of the PRS, and the quantity of the subframe transmitted consecutively every time and bandwidth for transmitting the subframe consecutively every time.

Step 701: the base station acquires a currently needed PRS sequence $r_{l,n_s}(m')$ with a length of $2 \times N_{RB}^{PRS}$.

Step 702: the base station determines the position of the PRS sequence $r_{l,n_s}(m')$ in a physical resource block.

Step 703: the base station transmits the PRS sequence $r_{l,n_s}(m')$ at the determined physical resource position.

The above-mentioned Step 701 and Step 702 are not executed in sequence and may be executed at the same time.

The specific realization of Steps 701~703 is similar to that of the steps of the PRS transmitting method according to the embodiment as shown in FIG. 6 and is not described in detail again here.

Step 704: the UE receives the PRS according to the configuration information of the base station and implements positioning.

After that, the UE will feedback the position information to the base station.

Figure 8:
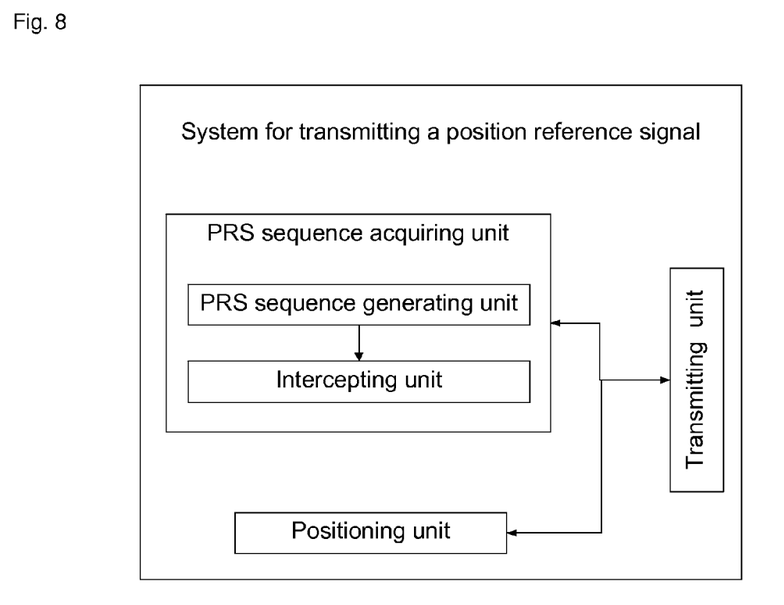
FIG. 8 is a schematic diagram of a PRS transmitting system based on an embodiment of the present disclosure.

FIG. 8 is a schematic diagram of a system for transmitting a position reference signal according to an embodiment of the present disclosure. As shown in FIG. 8, the system for transmitting position reference signals includes a PRS sequence acquiring unit, a positioning unit and a transmitting unit;

wherein the PRS sequence acquiring unit is configured to acquire a currently needed PRS sequence $r_{l,n_s}(m')$ with a length of $2 \times N_{RB}^{PRS}$, wherein $N_{RB}^{PRS}$ is the PRS bandwidth configured by high layer signaling;

wherein the PRS sequence acquiring unit can directly generate the currently needed PRS sequence $r_{l,n_s}(m')$ with the length of $2 \times N_{RB}^{PRS}$, wherein $N_{RB}^{PRS}$ is the PRS bandwidth configured by high layer signaling;

the PRS sequence acquiring unit further includes a PRS sequence generating unit and an intercepting unit, wherein the PRS sequence generating unit is configured to generate a PRS sequence with a length of $2 \times N_{RB}^{max,DL}$, wherein $N_{RB}^{max,DL}$ is the maximum downlink bandwidth;

the intercepting unit is configured to intercept the PRS sequence with the length of $2 \times N_{RB}^{PRS}$ from the PRS sequence with the length of $2 \times N_{RB}^{max,DL}$ generated by the PRS sequence generating unit;

the positioning unit is configured to determine the position of the PRS sequence acquired by the PRS sequence acquiring unit in a physical resource block;

the transmitting unit is configured to transmit the PRS sequence acquired by the PRS sequence acquiring unit at the position determined by the positioning unit.

The implementation of the units in the system for transmitting position reference signals is similar to the aforementioned implementation of the method for transmitting a position reference signal and is not described again here.

The foregoing description is only the illustrative embodiments of the present disclosure and is not intended to limit the present disclosure. For those skilled in the art, the present disclosure may have various changes and modifications. All modifications, equivalent substitutions and improvements, etc., made without departing from the spirit and principle of the present disclosure shall be included in the appended claims of the present disclosure.

What is claimed is:

1. A method for transmitting a position reference signal, comprising:

acquiring a currently needed Position Reference Signal (PRS) sequence with a length of $2 \times N_{RB}^{PRS}$, wherein $N_{RB}^{PRS}$ is PRS bandwidth configured by high layer signaling and represented by a unit of a resource block;

determining a position of the PRS sequence in a physical resource block; and transmitting the acquired PRS sequence at the determined position;

wherein acquiring the currently needed PRS sequence with the length of $2 \times N_{RB}^{PRS}$ comprises:

generating a PRS sequence with a length of $2 \times N_{RB}^{max,DL}$, wherein $N_{RB}^{max,DL}$ is a maximum downlink bandwidth; and intercepting a PRS sequence with the length of $2 \times N_{RB}^{PRS}$ from the PRS sequence with the length of $2 \times N_{RB}^{max,DL}$.

2. The method according to claim 1, wherein the PRS sequence with the length of $2 \times N_{RB}^{max,DL}$ is $r_{l,n_s}(m)$:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1,$$

wherein $n_s$ is an index of a slot in a radio frame, l is an index of an OFDM symbol in a slot, and c(i') is a second pseudorandom sequence generated by an initial value $c_{init}$ of a pseudorandom sequence.

3. The method according to claim 2, wherein when the subframe is a non-MBSFN subframe, $$c_{init} = 2^{10} \cdot (7 \cdot (n_s + 1) + l + 1) \cdot (2 \cdot N_{ID}^{cell} + 1) + 2 \cdot N_{ID}^{cell} + N_{CP},$$

$$\text{wherein } N_{CP} = \begin{cases} 1 & \text{when the cyclic prefix is a normal cyclic prefix} \\ 0 & \text{when the cyclic prefix is an extended cyclic prefix,} \end{cases}$$

and $N_{Cell}^{ID}$ is an identity of a cell;

when the subframe is an MBSFN subframe, $c_{init}=2^9 \cdot (7 \cdot (n_s+1)+l+1) \cdot (2 \cdot N_{ID}^{MBSFN}+1)+N_{ID}^{MBSFN}$, wherein $N_{ID}^{MBSFN}$ is an identity of an MBSFN subframe.

4. The method according to claim 2, wherein intercepting the PRS sequence with the length of $2 \times N_{RB}^{PRS}$ from the generated PRS sequence with the length of $2 \times N_{RB}^{max,DL}$ comprises:

the generated PRS sequence with the length of $2 \times N_{RB}^{PRS}$ is represented by $r_{l,n_s}(m')$, wherein m'=q+h, and q=0,1,K, $2 \cdot N_{RB}^{PRS}-1$, and $h=N_{RB}^{max,DL}-N_{RB}^{PRS}$, or, $h=(N_{RB}^{max,DL}-N_{RB}^{PRS})=2$.

5. The method according to claim 1, wherein intercepting the PRS sequence with the length of $2 \times N_{RB}^{PRS}$ from the generated PRS sequence with the length of $2 \times N_{RB}^{max,DL}$ comprises:

the generated PRS sequence with the length of $2 \times N_{RB}^{PRS}$ is represented by $r_{l,n_s}(m')$, wherein m'=q+h, and q=0,1,K, $2 \cdot N_{RB}^{RBS}-1$, and $h=N_{RB}^{max,DL}-N_{RB}^{PRS}$, or, $h=(N_{RB}^{max,DL}-N_{RB}^{PRS}) \times 2$.

6. The method according to claim 1, wherein determining an initial frequency domain position $V_{shift}$ of the PRS sequence in the physical resource block is:

$$v_{shift} = \left(\sum_{i''=0}^{7} 2^{i''} c\left(i'' + 8\left\lfloor \frac{n_s}{2} \right\rfloor\right)\right) \bmod 6;$$

or $$v_{shift} = \left(\sum_{i''=0}^{7} 2^{i''} c(i'')\right) \bmod 6;$$

-continued or $$v_{shift} = N_{Cell}^{ID} \bmod 6,$$

wherein a third pseudorandom sequence c(i") is generated according to $C_{init}=N_{Cell}^{ID}$, and $N_{Cell}^{ID}$ is an identity of a cell.

7. The method according to claim 6, wherein
in a non-MBSFN subframe, determining the position of the PRS sequence in the physical resource block is:
when the cyclic prefix of a system is a normal cyclic prefix:

$$k = 6q + (6 - l + v_{shift}) \bmod 6$$

$$l = \begin{cases} 3, 5, 6 & \text{if } n_s \bmod 2 = 0 \\ 1, 2, 3, 5, 6 & \text{if } n_s \bmod 2 = 1 \text{ and } (p = 0, 1) \\ 2, 3, 5, 6 & \text{if } n_s \bmod 2 = 1 \text{ and } (p = 0, 1, 2, 3); \end{cases}$$

$$q = 0, 1, K, 2 \cdot N_{RB}^{PRS} - 1$$

when the cyclic prefix of a system is an extended cyclic prefix:

$$k = 6q + (5 - l + v_{shift}) \bmod 6$$

$$l = \begin{cases} 4, 5 & \text{if } n_s \bmod 2 = 0 \\ 1, 2, 4, 5 & \text{if } n_s \bmod 2 = 1 \text{ and } (p = 0, 1) \\ 2, 4, 5 & \text{if } n_s \bmod 2 = 1 \text{ and } (p = 0, 1, 2, 3); \end{cases}$$

$$q = 0, 1, K, 2 \cdot N_{RB}^{PRS} - 1$$

in an MBSFN subframe, determining the position of the PRS sequence in the physical resource block is:

$$k = 6q + (5 - l + v_{shift}) \bmod 6$$

$$l = \begin{cases} 2, 3, 4, 5 & \text{if } n_s \bmod 2 = 0 \\ 0, 1, 2, 3, 4, 5 & \text{if } n_s \bmod 2 = 1; \end{cases}$$

$$q = 0, 1, K, 2 \cdot N_{RB}^{PRS} - 1$$

wherein l is an index of an OFDM symbol in a slot, k is an index of a subcarrier on an OFDM symbol l, p is an antenna port, and $V_{shift}$ is an initial frequency domain position of a PRS sequence in a physical resource block.

8. The method according to claim 1, wherein transmitting the acquired PRS sequence at the determined position comprises:
when the PRS sequence and data carried by a Physical Downlink Control Channel (PDCCH) are transmitted on the same bandwidth, only the data carried by the PDCCH is transmitted.

9. The method according to claim 1, wherein transmitting the acquired PRS sequence at the determined position comprises:
when the PRS sequence and data carried by a Physical Downlink Shared Channel (PDSCH) are transmitted on a same bandwidth, a carrier mapped with PRS is avoided when mapping PDSCHs of R10 and R9 versions onto carriers; and
when the PRS and data carried by a PDSCH of R8 version are transmitted on a same Resource Element (RE), only the PRS data on the RE is transmitted.

10. The method according to claim 1, wherein transmitting the acquired PRS sequence at the determined position comprises:
when the PRS sequence and data carried by a PDSCH are transmitted on a same bandwidth, a power of each RE of PRS is consistent with a power of an RE of the PDSCH carrying the data on an OFDM symbol where the RE of PRS is located; and
when the PRS sequence and data carried by a PDSCH are transmitted on different bandwidths, a power of each RE of PRS is 6 times a power of an RE of the PDSCH carrying the data on the OFDM symbol where the RE of PRS is located.

11. The method according to claim 1, wherein transmitting the acquired PRS sequence at the determined position comprises:
the transmitting power of the PRS sequence is consistent with the transmitting power of a Cell-Specific Reference Signal (CRS); or the transmitting power of the PRS sequence is configured through signaling.

12. A system for transmitting a position reference signal, comprising a PRS sequence acquiring unit, a positioning unit and a transmitting unit;
wherein the PRS sequence acquiring unit is configured to acquire a currently needed PRS sequence with a length of $2 \times N_{RB}^{PRS}$, wherein $N_{RB}^{PRS}$ is a PRS bandwidth configured by high layer signaling;
the positioning unit is configured to determine a position of the PRS sequence acquired by the PRS sequence acquiring unit in a physical resource block; and
the transmitting unit including a circuitry, is configured to transmit the PRS sequence acquired by the PRS sequence acquiring unit at the position determined by the positioning unit;
wherein the PRS sequence acquiring unit comprises a PRS sequence generating unit and an intercepting unit;
wherein the PRS sequence generating unit is configured to generate a PRS sequence with a length of $2 \times N_{RB}^{max,DL}$, wherein $N_{RB}^{max,DL}$ is a maximum downlink bandwidth; and
the intercepting unit is configured to intercept the PRS sequence with the length of $2 \times N_{RB}^{PRS}$ from the PRS sequence with the length of $2 \times N_{RB}^{max,DL}$ generated by the PRS sequence generating unit.

* * * * *